US012647340B2

(12) United States Patent
Somawagol et al.

(10) Patent No.: US 12,647,340 B2
(45) Date of Patent: Jun. 2, 2026

(54) METHOD AND SYSTEM FOR FRAMEWORK AGNOSTIC SMART TEST ORCHESTRATION IN NETWORK TEST AUTOMATION

(71) Applicant: INFOSYS LIMITED, Bangalore (IN)

(72) Inventors: Basavaraj Veerappa Somawagol, Bangalore (IN); Balaji Thangavelu, Bangalore (IN); Sreekanth Sreedevi Sasidharan, Bangalore (IN)

(73) Assignee: Infosys Limited, Bangalore (IN)

( * ) Notice: Subject to any disclaimer, the term of this patent is extended or adjusted under 35 U.S.C. 154(b) by 346 days.

(21) Appl. No.: 18/513,339

(22) Filed: Nov. 17, 2023

(65) Prior Publication Data

US 2025/0112848 A1    Apr. 3, 2025

(30) Foreign Application Priority Data

Sep. 28, 2023    (IN) .............................. 202341065253

(51) Int. Cl.
*H04L 43/50*            (2022.01)
(52) U.S. Cl.
CPC ................................... *H04L 43/50* (2013.01)

(58) Field of Classification Search
None
See application file for complete search history.

(56)                References Cited

U.S. PATENT DOCUMENTS

2017/0302994 A1* 10/2017 Kumar .................. H04N 7/173
2023/0409418 A1* 12/2023 Sood .................... G06F 11/2273
2024/0223489 A1*  7/2024 Wu ........................ H04L 43/106

* cited by examiner

*Primary Examiner* — Angela Nguyen
(74) *Attorney, Agent, or Firm* — Finnegan, Henderson, Farabow, Garrett & Dunner, LLP

(57)                ABSTRACT

This disclosure relates to method and system for framework agnostic smart test orchestration in network test automation in a network. The method includes receiving input data for executing one or more test scripts to test one or more functions on one or more devices in the network. The input is received from a user device via a web-based application. The method comprises parsing the input data and selecting an execution module from a plurality of execution modules for executing the one or more test scripts on the one or more devices based on the parsed input data. The method comprises executing the one or more test scripts to test the one or more functions on the one or more devices using the selected execution module.

20 Claims, 9 Drawing Sheets receiving, by a computing device from a user device via a web-based application, input data for executing one or more test scripts to test one or more functions on one or more devices in the network 402 parsing, by the computing device, the input data 404 selecting, by the computing device, an execution module from a plurality of execution modules, for executing the one or more test scripts on the one or more devices based on the parsed input data 406 executing, by the computing device, the one or more test scripts to test the one or more functions on the one or more devices using the selected execution module 408

400

```
┌─────────────────────────────────────────────────┐
│   receiving, by a computing device from a user    │
│   device via a web-based application, input data  │
│   for executing one or more test scripts to test  │
│   one or more functions on one or more devices    │
│   in the network 402                              │
└─────────────────────────────────────────────────┘
                        │
                        ▼
┌─────────────────────────────────────────────────┐
│                                                   │
│   parsing, by the computing device, the input     │
│   data 404                                        │
│                                                   │
└─────────────────────────────────────────────────┘
                        │
                        ▼
┌─────────────────────────────────────────────────┐
│   selecting, by the computing device, an          │
│   execution module from a plurality of execution  │
│   modules, for executing the one or more test     │
│   scripts on the one or more devices based on the │
│   parsed input data 406                           │
└─────────────────────────────────────────────────┘
                        │
                        ▼
┌─────────────────────────────────────────────────┐
│   executing, by the computing device, the one or  │
│   more test scripts to test the one or more       │
│   functions on the one or more devices using the  │
│   selected execution module 408                   │
└─────────────────────────────────────────────────┘
```

400

FIG. 4

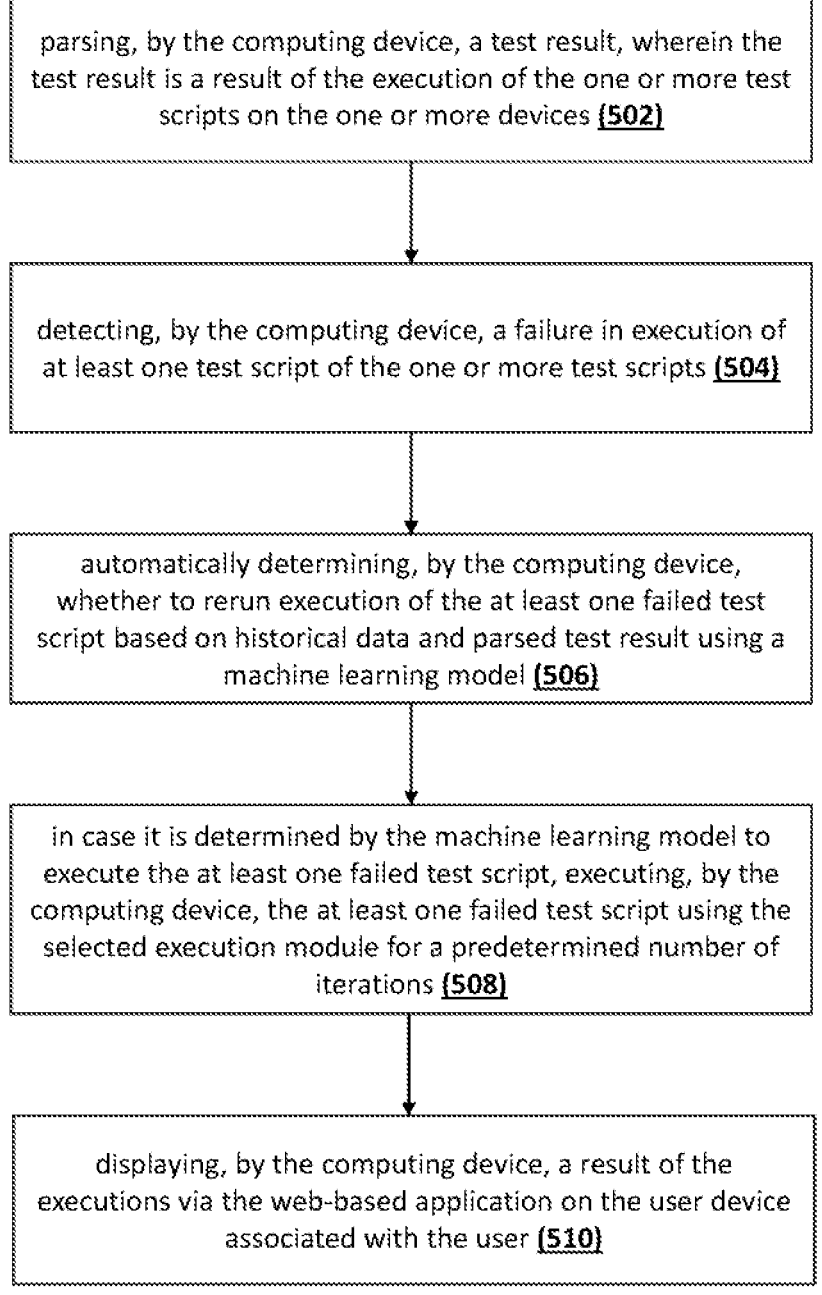

parsing, by the computing device, a test result, wherein the test result is a result of the execution of the one or more test scripts on the one or more devices (502)

detecting, by the computing device, a failure in execution of at least one test script of the one or more test scripts (504)

automatically determining, by the computing device, whether to rerun execution of the at least one failed test script based on historical data and parsed test result using a machine learning model (506)

in case it is determined by the machine learning model to execute the at least one failed test script, executing, by the computing device, the at least one failed test script using the selected execution module for a predetermined number of iterations (508)

displaying, by the computing device, a result of the executions via the web-based application on the user device associated with the user (510)

500          FIG. 5

METHOD AND SYSTEM FOR FRAMEWORK AGNOSTIC SMART TEST ORCHESTRATION IN NETWORK TEST AUTOMATION

CROSS-REFERENCE TO RELATED APPLICATION

This application claims priority to Indian patent application Ser. No. 20/234,1065253, filed on Sep. 28, 2023, which is hereby incorporated by reference in its entirety.

FIELD

This disclosure relates generally to automation testing, and more particularly to method and system for framework agnostic smart test orchestration in network test automation.

BACKGROUND

Network testing is an integral part of any network software release and rollout process. It ensures that a developed network application and function executes without errors or failures to provide a smoother experience to users. Previously, network testing was performed manually, with a tester interacting with network functions and applications in accordance with some pre-planned test cases to validate operation of the network function for those test cases. Over the past few years, many techniques have been developed to automate testing, providing an improved testing speed, thoroughness, and accuracy. As a result, one or more steps of a test case may be currently automated or can potentially be automated. Similarly, one or more test cases of a test suite may be currently or can potentially be automated.

Each layer of built-in layered architecture in networking technology is developed by different manufacturers. Each manufacturer implements its own standards of programming for the architecture. Different standards of programming require specific test tools. For example, Robo framework is an open-source framework, which supports only the test script in Python language. Similarly, Mocha test framework supports Java. Presently, integration of test scripts written in different languages is not possible. Therefore, a test engineer working on a network using components supporting Robo framework and Mocha framework is required to understand both Python and Java language.

In addition, the traditional way of development of complex script for testing automation is very time consuming. One engineer needs to write code for the entire script while combining multiple technologies. Moreover, usage of multiple testing frameworks in the networks increase the overall cycle time of testing. In the traditional methods of network testing, dynamic data analysis for real time feedback and adjustments to test execution are not possible.

Therefore, there is a need to overcome the problems mentioned above. There is a need for a single testing framework for networks.

SUMMARY

In one embodiment, a method for framework agnostic smart test orchestration in network test automation for a network is disclosed. In one example, the method may include receiving, by a computing device from a user device via a web-based application, input data for executing one or more test scripts to test one or more functions on one or more devices in the network. Further, the method may include parsing the input data by the computing device and selecting an execution module from a plurality of execution modules for executing the one or more test scripts on the one or more devices based on the parsed input data. The method may further include executing the one or more test scripts to test the one or more functions on the one or more devices using the selected execution module by the computing device.

In one embodiment, a system for framework agnostic smart test orchestration in network test automation for a network is disclosed. In one example, the system may include a processing circuitry and a memory communicatively coupled to the processing circuitry. The memory may store processor-executable instructions, which, on execution, may cause the processing circuitry to receive from a user device via a web-based application, input data for executing one or more test scripts to test one or more functions on one or more devices in the network. The processor-executable instructions, on execution, may further cause the processing circuitry to parse the input data, select an execution module from a plurality of execution modules, for executing the one or more test scripts on the one or more devices based on the parsed input data, and execute the one or more test scripts to test the one or more functions on the one or more devices using the selected execution module.

In another embodiment, a method for framework agnostic smart test orchestration in network test automation for a network is disclosed. The method may include receiving input data by a computing device from a user device via a web-based application. The method may include parsing the input data by the computing device. The method may further include selecting an execution module and one or more telemetry modules based on the parsed input data. Each of the one or more telemetry modules may correspond to each of one or more devices in the network. The method may further include selecting an execution module and one or more telemetry modules based on the parsed input data by the computing device. Each of the one or more telemetry modules may correspond to each of one or more devices in the network. The method may further include executing at least one test script to test one or more functions on the one or more devices using the selected execution module by the computing device. Further, the method may include monitoring health data of the one or more devices using the selected one or more telemetry modules, and displaying the health data of the one or more devices on the user device, while executing the at least one test script and a result of the execution of the at least one test script after completion of the execution of the at least one test script.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

FIG. 4 is a flow diagram of an exemplary process for framework agnostic smart test orchestration in network test automation, in accordance with an exemplary embodiment of the present disclosure;

FIG. 5 is a flow diagram of an exemplary process for rerunning test scripts, in accordance with an exemplary embodiment of the present disclosure;

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
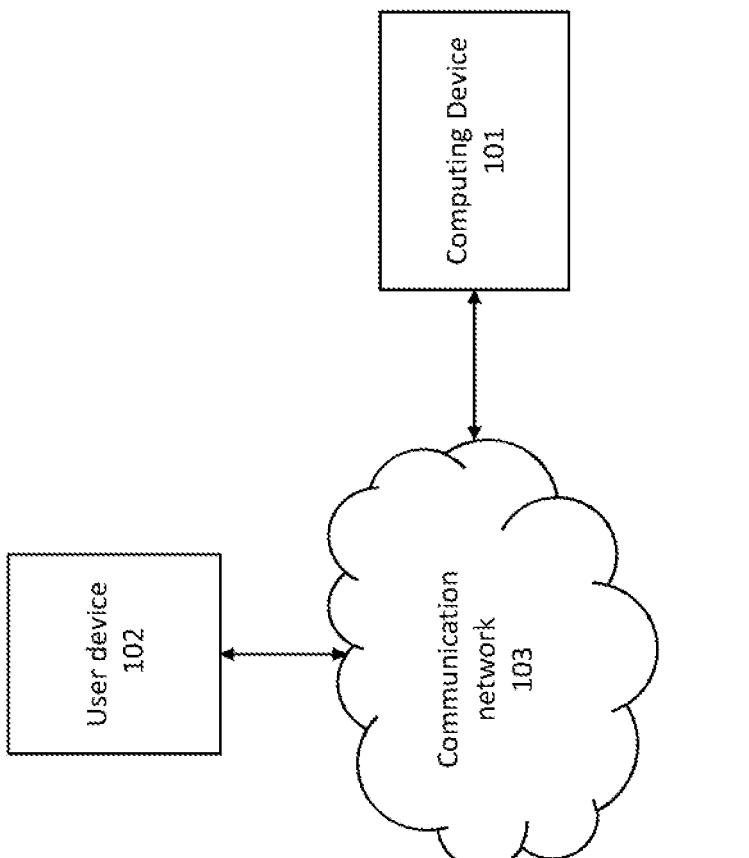
FIG. 1 is a block diagram of an environment for framework agnostic smart test orchestration in network test automation, in accordance with an exemplary embodiment of the present disclosure.

FIG. 1 is a diagram that illustrates an environment 100 for framework agnostic smart test orchestration in network test automation in a network, in accordance with an exemplary embodiment of the present disclosure.

The environment 100 may include a computing device 101 and a user device 102 associated with a user. The computing device 101 and the user device 102 are configured to communicate with each other via a communication network 103. Examples of the communication network 103 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

The user device 102 may provide the input to the computing device 101 through the communication network 103 via a wired connection or a wireless connection, or a combination thereof. The wired connection between the user device 102 and the computing device 101 may include, but is not limited to, B-ISDN, DSL, ADSL, ADSL+2, SDSL, VDSL, and cable. The wireless connection between the user device 102 and the computing device 101 may include, but is not limited to, wireless LAN, wireless MAN, wireless PAN, and wireless WAN.

The user device 102 may be, but is not limited to, a tablet, a smartphone, a laptop, a desktop, a server, or any other computing device. The user device 102 may include one or more input devices, such as a keyboard, a mouse, and the like. Also, the user device 102 may include one or more output devices, such as a digital screen, analog screen, speakers, printer, etc. The user device 102 may receive an input from the user in a computer-readable format such as, but not limited to, a text format, a video format, or an image format. The user device 102 may provide an output to the user in computer-readable formats such as, but not limited to, a text format, a video format, or an image format.

The computing device 101 may be, but is not limited to, a laptop, a desktop, a server, or any other computing device. In some embodiments, the computing device 101 may be a centralized server or a group of decentralized servers. The computing device 101 may be configured to manage or execute at least one of a plurality of stages in an application development process.

Elements of the environment 100 may be implemented within an enterprise. The enterprise may be an individual, business, company, or any other organization. The enterprise may include one or more lines of business, subsidiaries, or parent organizations. The enterprise may have already deployed or may be planning to deploy one or more applications (for example, a website, a software product, or a software-based service). The enterprise may require testing of the one or more applications which may be written in same or different programming languages.

In some embodiments, the computing device 101 and the user device 102 may be associated with the enterprise. In some other embodiments, a second enterprise may offer application testing services or products to a first enterprise that has deployed or is planning to deploy the one or more applications. In such embodiments, the computing device 101 may be associated with the second enterprise and the user device 102 may be associated with the first enterprise. Alternately, the computing device 101 may implement an application testing product of the second enterprise but the computing device 101 and the user device 102 may both be associated with the first enterprise.

The user (i.e., any person, end user, a group, or entities that may want to execute a test script or a test suite) may communicate with the computing device 101 through the user device 102. It should be noted that the user device 102 may be accessed by more than one user. In an embodiment, the user device 102 may be accessed by a plurality of users at different points of time. For example, the plurality of users may be a group of application testers. The group of application testers may want to execute one or more test suites which may be written in same or different programming languages. In some examples, the group of application testers may want to monitor the health of network elements involved in execution of test cases while the test cases are being executed. In an embodiment, the user device 102 may be collaboratively accessed by the plurality of users simultaneously through cloud.

As will be appreciated, application testing is a process in application development for validating and verifying working of an application. Application testing is integral to an application development process to identify errors, bugs, risks, or any other issues with the application. It should be noted that the application testing process may not be limited to identifying faults in the application but may also be used to find measures to upgrade the application in terms of efficiency, usability, accuracy, etc. Application testing may be performed on a testing platform.

Generally, an application testing process includes a test plan to be executed. The test plan may document a strategy that will be used to test the application. For example, the strategy may be used to verify and ensure that the application meets certain design specifications, functional requirements, and other requirements, or to verify that the application is error-free. The test plan may be designed by one or more human resources or consultants associated with the enterprise. In a preferred embodiment, the test plan may be designed in accordance with an IEEE standard, such as 829-2008 IEEE Standard for Software and System Test Documentation, 1008-1987 IEEE Standard for Software Unit Testing, 1012-2004 IEEE Standard for Software Verification and Validation, or the like. The test plan may include one or more test suites. A test suite is a group of test cases. The test suite may include detailed instructions or goals for the group of test cases and information on system configuration to be used during testing.

A test case is the most fundamental part of an application testing process. The test case may include a certain set of conditions (or test steps) that need to be checked to test an application or a component thereof. Further, the test case may include an expected output for each of the set of conditions. Upon completing a check of the set of conditions, an actual output from the application for each of the set of conditions may be recorded. Then, the actual output may be compared with the expected output to determine whether the test case provided any errors (i.e., the actual output is different from the expected output), or the test case was successfully completed (i.e., the actual output is same as the expected output). In other words, when a condition of a test case is checked, it checks whether the actual output is same as or at least in alignment with the expected output. A test case may include one or more parameters such as Id, condition, steps, input, expected result, actual result, status, and remarks. Further, a network test case may correspond to domains such as voice, data, Wi-Fi, video, and the like.

In some embodiments, the test case may be automated by a scripting language, such as, but not limited to, C, C++, Java, Python, Ruby, etc. In some other embodiments, the test case may be manually executed by human testers. Alternately, the test case may include a combination of automated and manual test steps. Manual testing may consume more time to test the test case. The manual testing of test cases may be efficient for small software programs. Automated testing may use a lot of resources but may perform the testing in significantly less time compared to the manual testing. The automatic testing may be efficient for software that may, for example, need frequent testing, or have lengthy source code, or have a huge number of test cases.

Usually, a user needs to arrange automated tests into a consecutive sequence for execution. This is referred to as test orchestration. When the automated tests are carried out in a networking domain, it is referred to as network test orchestration. The scripting language of different test suites may be different. For example, a test suite may be written in Java language and another test suite may be written in Python language. In some cases, the test cases within a test suite may also be written in different languages. The test cases written in one scripting language generally requires a test tool supporting the same scripting language. Thus, network testing involves testing multiple network elements which may be tested using different test tools. However, having multiple test tools slow down the test orchestration process and even increases the cost of test orchestration. Therefore, it is important to integrate multiple test tools in a single framework to address these problems.

The computing device 101 may render a Graphical User Interface (GUI) on a display of the user device 102. In some embodiments, the GUI may be rendered on a web browser on the display of the user device 102. The GUI may include a test scheduling dashboard. The user may schedule execution of multiple test suites. The status of the execution of the scheduled test cases may be visible to the user through the GUI. The GUI may also display a lab view set up, which may display the network devices involved in the test executions and their respective telemetries in real time.

To schedule an execution of a test suite the user may provide inputs such as testbed, firmware version, modules of test suites to be executed via the GUI. The input data may be in the form of audio data, image data, video data, or textual data. The user may also schedule the execution of test cases immediately or later. The computing device 101 may be configured to receive the inputs provided by the user and based on the inputs, the computing device 101 may be configured to detect the scripting language in the test suites to be executed. Based on the detected scripting language, the computing device 101 may be configured to select an execution module, which is compatible with the detected scripting language, for executing the test suites.

In some embodiments, the computing device 101 may be configured to determine the network elements involved in the execution of the test suites. In other embodiments, the user may input, via the GUI, the network elements involved in the execution of the test suites. The computing device 101 may also display the health of the network elements involved in the execution of the test suites to the user via the GUI. In case one or more test cases fail, the computing device 101 may be configured to rerun the failed test cases iteratively up to a predefined number of times. In some embodiments, the computing device 101 may automatically determine whether to rerun execution of the failed test scripts based on historical data using machine learning models. The computing device 101 may be configured to display the results of the execution and/or reruns on the user device 102 via the GUI.

Figure 2:
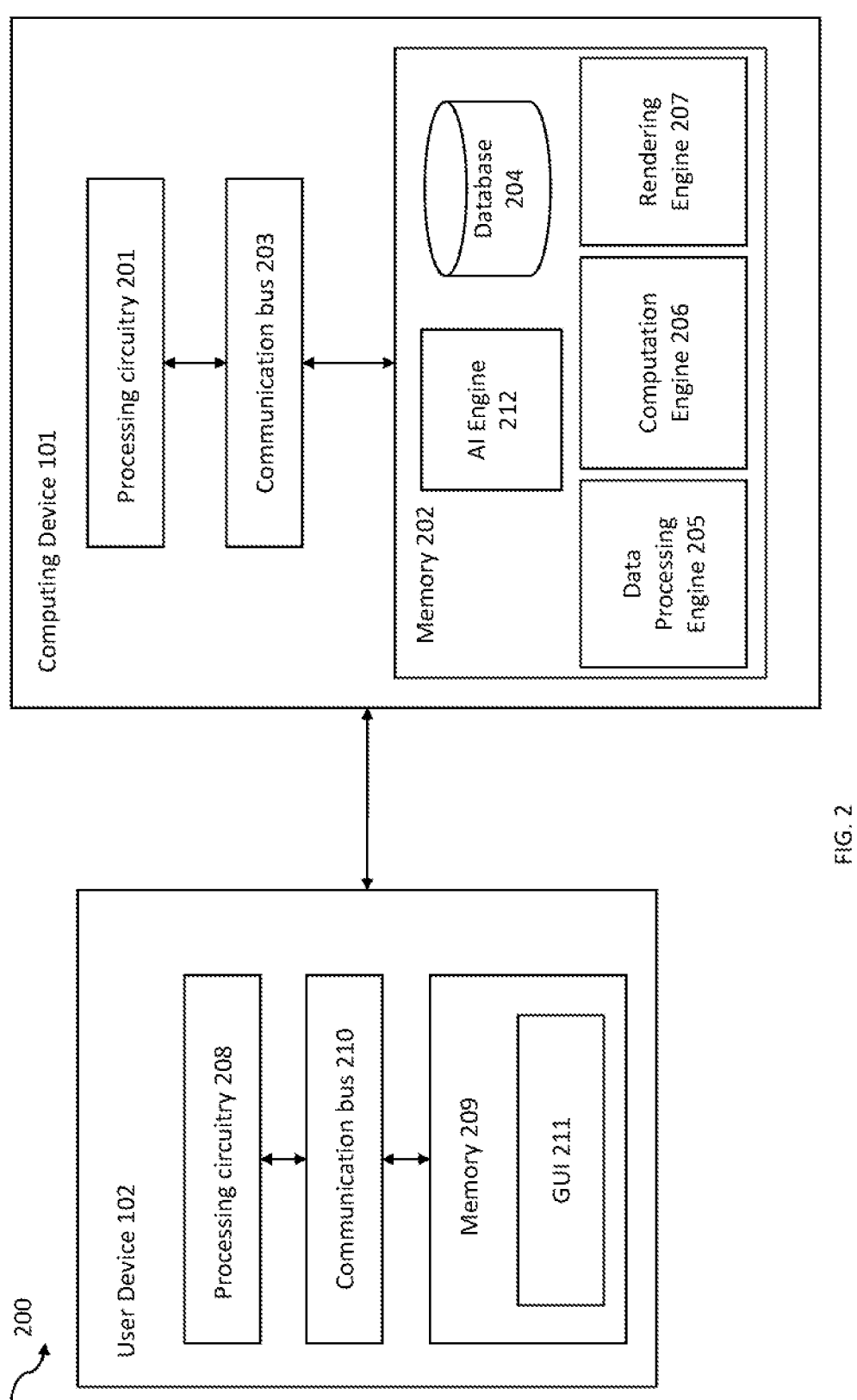
FIG. 2 is a block diagram of a system for framework agnostic smart test orchestration in network test automation, in accordance with an exemplary embodiment of the present disclosure.

FIG. 2 is a block diagram that illustrates a system 200 for framework agnostic smart test orchestration in network test automation, in accordance with an exemplary embodiment of the present disclosure. FIG. 2 is explained in conjunction with elements from FIG. 1. The system 200 may include the computing device 101 and the user device 102. In an embodiment, the computing device 101 may include a processing circuitry 201 and a memory 202 communicatively coupled to the processing circuitry 201 via a communication bus 203. The memory 202 may store processor instructions. The processor instructions, when executed by the processing circuitry 201, may cause the processing circuitry 201 to implement one or more embodiments of the present disclosure such as, but not limited to, receiving input data for executing one or more test scripts to test one or more functions on one or more devices in the network, parsing the input data, selecting an execution module from a plurality of execution modules for executing the one or more test scripts on the one or more devices based on the parsed input data, and executing the one or more test scripts to test the one or more functions on the one or more devices using the selected execution module. Further, the memory 202 of the computing device 101 may include a database 204, a data processing engine 205, a computation engine 206, a rendering engine 207, and an Artificial Intelligence (AI) engine 212.

The data processing engine 205 may be configured to perform data processing functions such as parsing data received from the user device 102 for recognition of the scripting language used in test scripts. The input data may comprise at least one test suite. The test suite may comprise one or more test cases. The test suite may be parsed for identifying a test framework associated with one or more test scripts. The data processing engine 205 may further be configured to parse test results. A test result may be a result of the execution of one or more test scripts on one or more devices. In some embodiments, the data processing engine 205 may be a part of the computing engine 101. The computing engine 206 may be configured to select an execution module from a plurality of execution modules, for executing the one or more test scripts. The computing engine 206 may further be configured to continuously monitor health data of the one or more devices while executing the test scripts. After completion of the execution of the test scripts, the computing engine 206 may be configured to detect a failure in execution of at least one test script of the one or more test scripts.

The AI engine 212 may be configured to determine whether to rerun execution of the at least one failed test script based on historical data and parsed test result using a machine learning model, for example, a multiple linear regression model. The rendering engine 207 may be configured to render the result of the executions via the web browser on the user device 102. Further, the rendering engine 207 may be configured to display the health data via the web browser on the user device 102, while executing the test scripts.

Further, the user device 102 of the system 200 may include a processing circuitry 208 and a memory 209 communicatively coupled to the processing circuitry 208 via a communication bus 210. Further, the memory 209 of the user device 102 may store processor instructions. The processor instructions, when executed by the processing circuitry 208, may cause the processing circuitry 208 to implement one or more embodiments of the present disclosure such as, but not limited to, receiving user inputs for test script execution through a GUI, displaying status or report of test script execution through the GUI, displaying device telemetry to the user through the GUI. The memory 209 may include a GUI 211.

It should be noted that all such engines 204-207 and 212 may be represented as a single module or a combination of different modules. Further, as will be appreciated by those skilled in the art, each of the engines 204-207 and 212 may reside, in whole or in parts, on one device or multiple devices in communication with each other. In some embodiments, each of the engines 204-207 and 212 may be implemented as dedicated hardware circuit comprising custom application-specific integrated circuit (ASIC) or gate arrays, off-the-shelf semiconductors such as logic chips, transistors, or other discrete components. Each of the engines 204-207 and 212 may also be implemented in a programmable hardware device such as a field programmable gate array (FPGA), programmable array logic, programmable logic device, and so forth. Alternatively, each of the engines 204-207 and 212 may be implemented in software for execution by various types of processors (e.g., the processing circuitry 201). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module, and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for framework agnostic smart test orchestration in network test automation. For example, the exemplary computing device 101 may execute multiple test scripts corresponding to different frameworks by the processes discussed herein. As will be appreciated by those of ordinary skill in the art, control logic and/or automated routines for performing the techniques and steps described herein may be implemented by the computing device 101 either by hardware, software, or combinations of hardware and software. For example, suitable code may be accessed and executed by the one or more processors on the computing device 101 to perform some or all the techniques described herein. Similarly, application specific integrated circuits (ASICs) configured to perform some, or all the processes described herein may be included in the one or more processors on the computing device 101.

Figure 3:
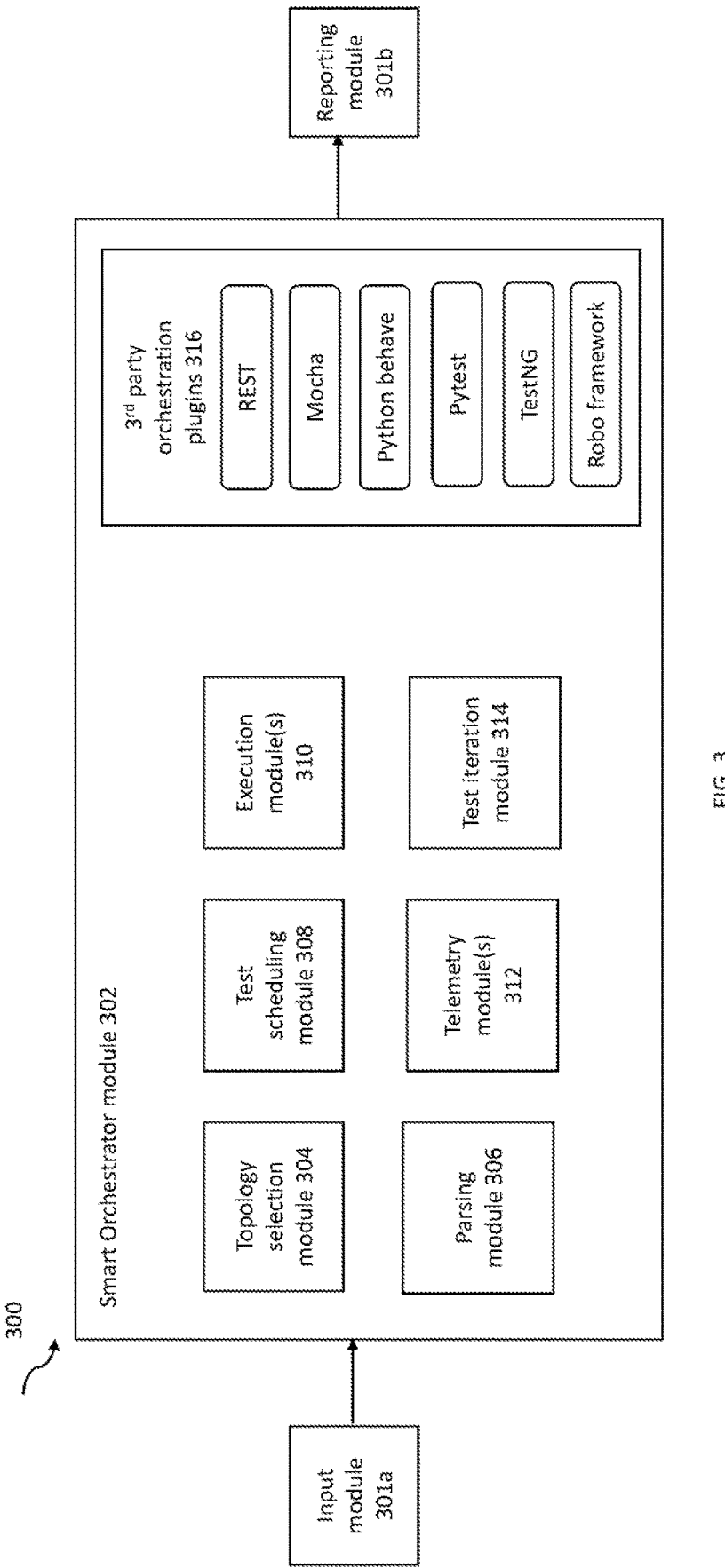
FIG. 3 is a block diagram depicting a smart orchestrator module of the computing engine, in accordance with an exemplary embodiment of the present disclosure.

FIG. 3 is a block diagram of the computing engine 300. The computation engine 300 may be a computation engine 206 of the computing device 101 as represented in FIG. 2. The computation engine 300 may comprise a smart orchestrator module 302, which may be configured to perform the functions described in the disclosure. The smart orchestrator module 302 may comprise multiple modules such as a topology selection module 304, a parsing module 306, a test scheduling module 308, one or more execution modules 310, one or more telemetry modules 312, a test iteration module 314, and third-party orchestration plugins 316. A single execution module is indicated by 310 as well as one or more execution modules is also indicated by 310 in this disclosure. Similarly, a single telemetry module is indicated by 312 as well as one or more telemetry modules is also indicated by 312 in this disclosure.

The computation engine 300 may be communicatively connected to an input module 301a, and a reporting module 301b. The input module 301a may be configured to gather user inputs, such as the input data, from the user device 102. The input data may comprise a network topology and at least one test suite comprising one or more test cases. The one or more test cases may be required to be performed by one or more devices. The one or more devices may be connected in the network topology specified in the input data.

The input module 301a may process the data and provide the processed data to the smart orchestrator module 302. In some embodiments, the input module 301a may be configured to extract input data from the Application Program Interface (API) calls in a software code and provide the input data to the smart orchestrator module 302. In some embodiments, the input module 301a may be configured to provide input data to the smart orchestrator module 302 from both user through GUI 211 on the webpage and from the API calls.

The parsing module 306 may parse the one or more test cases in the test suite. The parsing module 306 may parse the one or more test cases to identify the scripting language (also referred to as test framework) in which the test cases are written. The test frameworks may be pytest, python behave, Mocha, TestNG, Robo framework, or REST. The parsing module 306 may transmit the identified test framework and the input data to the test scheduling module 308.

A laboratory, for testing functions on devices, may comprise multiple devices located on multiple racks or mounted on walls. A repository is a database having information of all the devices and their respective locations in the laboratory. Some devices may be connected in a network topology and be utilized to carry out testing executions. A topology may be a logical connection of those devices and may specify as to how those devices are grouped and tested in the framework. The devices selected for executing one test suite cannot be used in executing a parallel test suite.

The parsing module 306 may parse the network topology and send the parsed data related to network topology to the topology selection module 304. The topology selection module 304 may determine the one or more devices required to execute the test cases in the input data. The topology selection module 304 may select the one or more devices from the live repository for executing the test cases. The topology selection module 304 may lock the selected devices so that they are not used in execution of other test suites at the same time. Once execution the test suite is completed, the topology selection module 304 may unlock the selected devices in the live repositories, so that they may be utilized in execution of another test suite. The one or more devices may be a Wi-Fi gateway, IP phones, set top boxes, Wi-Fi clients, Wi-Fi boosters, LAN/WAN clients, routers, switches, Television (TV) units, traffic generators, telephones, cable modems, etc.

For example, the live repository may have 100 cable modems, 200 TVs, 50 telephones, and 70 set top boxes. The test suite specified in the input data may require 2 TVs, one set top box, and 7 cable modems, the topology selection module 304 may check the live repository and may select and lock 2 TVs, one set top box, and 7 cable modems for executing the test suite. Thus, after the selection, the live repository will be left with 93 available cable modems, 198 TVs, 50 telephones, and 69 set top boxes.

The test scheduling module 308 may be configured to schedule the execution of test cases sequentially. In some examples, a user may specify via the web browser on the user device 102 whether to schedule the test execution immediately or later. Accordingly, the test scheduling module 308 may schedule the execution of the test cases as per the user input. In some examples, the test scheduling module 308 may automatically schedule the execution of the test cases as per historical data. For example, the test scheduling module 308 may be configured to schedule test execution of one or more test cases weekly, daily, or hourly based on the execution of similar test cases in the past. In some embodiments, the test scheduling module 308 may schedule the execution of test cases based on the commands from Continuous Integration and Continuous Delivery (CI/CD) module. The test scheduling module 308 may act as a module that keeps track of the ongoing test executions and the executions scheduled in the future. Further, the test scheduling module 308 may manage the test execution queue and may record the time taken for the execution of all the test cases.

Further, based on the test framework identified by the parser module 306, the scheduling module 308 may be configured to select one execution module 310 from a plurality of execution modules 310. Each of the plurality of execution modules 310 may be associated with each of a plurality of third-party orchestration plugins 316. The third-party orchestration plugins 316 may be software models used for execution of test cases. The third-party orchestration plugins 316 may be capable of driving the third-party testing tools integrated in the system 200. Each plugin 316 acts as an interface between the smart test orchestration module and a third-party testing tool. The third-party testing tools may be REST, Mocha, pytest, Python behave, TestNG, Robo framework, and the like.

The selected execution module 310 may select at least one third-party orchestration plugin from the plurality of third-party orchestration plugins 316. In an example, the parsing module 306 may determine that the test framework associated with a test suite is REST, then the scheduling module 308 may select the execution module 310 associated with the third-party orchestration plugin that is related to REST framework.

The execution module 310 may read logs of the execution of the test suite. The logs of the execution of the test suite may comprise the status of the test cases, such as passed or failed. The execution module 310 may comprise one or more machine learning models which may determine whether to re-execute the failed test cases and the number of iterations the failed cases need to be executed again. In some embodiments, the machine learning models may be linear regression and neural network-based models.

The execution module 310 may determine whether to re-execute the failed test cases based on the type of failure of the test cases. The types of failure may be telnet failure, SSH failure, authentication issue, Wi-Fi signal noise, IP connectivity failure, and the like. The one or more machine learning models may be trained to determine which decision to be taken for each type of a failure. For example, if the minimum network speed for test execution is required to be 40 mbps, but if the execution module 310 determines that the actual network speed is 10 mbps, then the execution module 310 may determine to re-execute the failed test case. In some embodiments, the execution module 310 may decide whether to re-execute the failed test cases based on predefined conditions provided by the user. In other embodiments, the execution module 310 may decide whether to re-execute the failed test cases based on historical data.

If the execution module 310 determines to re-execute the failed test cases, the execution module 310 may send the failed test cases to the test iteration module 314. The execution module 310 may further send the number of iterations determined for re-executing the failed test cases to the test iteration module 314. The test iteration module 314 may execute the failed test cases multiple times based on the number of iterations determined by the execution module 310. Since, the failed test cases are executed by a separate module, i.e., by the test iteration module 314, the queue in the test scheduling module 308 is not disturbed. The test iteration module 314 may send the results of the executions to the execution module 310, which may send the results of all the test cases to the reporting module 301b.

The reporting module 301b may be configured to display the results of the execution via the web browser on the user device 102. In some embodiments, the reporting module 301b may store the results in a database 204 or a memory 202 of the computing device 101. The results may be in the form of charts, graphs, or tabular format. The result may be consolidated in an excel spreadsheet, html file, pdf file, image, etc.

In some embodiments, the reporting module 301b may be configured to display the status of the executions of the test cases on real-time basis. The status may comprise, pass, fail, in iterations, and the like.

Once the test cases are executed, the one or more telemetry modules 312 determine the health data of the one or more devices involved in the execution of the test cases. The health data may comprise an IP connectivity status, CPU utilization, memory utilization, an antenna temperature, Wi-Fi chipset temperature, upload and download speeds, and voice call activity. The one or more telemetry modules 312 may be configured to read protocols comprising one or more of: SNMPv2, SNMPv3, TR-181, TR-69, WebPA, and REST. For example, if 5 devices are involved in the test execution and 3 devices among the 5 devices support SNMPv2 protocol and 2 devices support TR-69 protocol, then the telemetry modules 312 corresponding to SNMPv2 protocol and TR-69 protocol may be selected and may be responsible for tracking the health of the respective devices. Therefore, the smart orchestrator module 302 may be configured to monitor the health of the devices, irrespective of the protocols supported by the devices.

The health data may be sent by the one or more telemetry modules 312 to the reporting module 301b. The reporting module 301b may be configured to display the health data of the one or more devices involved in the execution of the test cases via the web browser on the user device 102. Thus, the health data of the devices involved in the test cases may be displayed to the user in real time, while executing the test cases. In some embodiments, the reporting module 301b may be configured to store the health data in a database 204 or in a memory 202 of the computing device 101 for analysis or for future use.

FIG. 4 is a diagram that illustrates an exemplary process 400 for framework agnostic smart test orchestration, in accordance with an exemplary embodiment of the present disclosure. FIG. 4 is explained in conjunction with elements from FIGS. 1-3. In an embodiment, the process 400 may be implemented by the computing device 101. The process 400 may include receiving, by a computing device 101 from a user device 102 via a web-based application, input data for executing one or more test scripts to test one or more functions on one or more devices in a network, at step 402. The input data may comprise a network topology and at least a test suite comprising the one or more test scripts. The one or more devices may be connected to form the network topology. The one or more devices may comprise one or more of: a Wi-Fi gateway, IP phones, set top boxes, Wi-Fi clients, Wi-Fi boosters, LAN/WAN clients, routers, switches, and cable modems.

Further, the process 400 may include parsing, by computing device 101, the input data, at step 404. The computing device 101 may parse the at least one test suite for identifying a test framework associated with the one or more test scripts. The test framework may be one of: pytest, python behave, Mocha, TestNG, Robo framework, and REST. In some embodiments, the test framework associated with a test script may be identified by the computing device 101 based on a type of file of the test script.

Further, the process 400 may include selecting, by the computing device 101, an execution module 310 from a plurality of execution modules 310, for executing the one or more test scripts on the one or more devices based on the parsed input data, at step 406. The computing device 101 may select the execution model based on the identified test framework.

Further, the process 400 may include executing, by the computing device 101, the one or more test scripts to test the one or more functions on the one or more devices using the selected execution module 310, at step 408. The computing device 101 may display the status of the test execution on the user device 102 via a GUI 211.

Further, the process 400 may include continuously monitoring, by the computing device 101, health data of the one or more devices while executing the at least one test script. The process 400 may include displaying, by the computing device 101 on the user device 102 via the web-based application, the health data of the one or more devices while executing the at least one test script. The computing device 101 may be configured to execute the test scripts and monitor the device telemetry simultaneously. A user may be able to view the health of devices which are involved in the test execution in real time. The health data of each of the one or more devices comprises one or more of: an IP connectivity status, CPU utilization, memory utilization, an antenna temperature, Wi-Fi chipset temperature, upload and download speeds, and voice call activity.

FIG. 5 is a diagram that illustrates an exemplary process 500 for rerunning test scripts. FIG. 5 is explained in conjunction with elements from FIGS. 1, 2, and 3. In an embodiment, the process 500 may be implemented by the computing device 101. After execution of one or more test scripts, some of the test scripts may be failed. In such situations, the computing device 101 may be configured to decide whether to rerun or not to rerun the failed test scripts.

The process 500 may include parsing a test result by the computing device 101, at step 502. The test result may be a result of the execution of the one or more test scripts on the one or more devices. Further, the process 500 may include detecting, by the computing device 101, a failure in execution of at least one test script of the one or more test scripts, at step 504.

The process 500 may include automatically determining, by the computing device 101, whether to rerun execution of the at least one failed test script based on historical data and parsed test result using a machine learning model, at step 506. The historical data may comprise execution history of test scripts in the past, the patterns of rerunning the test scripts in the past, and the like. A machine learning model may be a multiple linear regression model or a neural network-based model.

In case it is determined by the machine learning model, at step 506, to execute the at least one failed test script, the process 500 may include executing, by the computing device 101, the at least one failed test script using the selected execution module 310 for a predetermined number of iterations, at step 508. The predetermined number of iterations may be specified by an engineer. In some embodiments, the predetermined number of iterations may be calculated using the machine learning model based on the historical data.

The process 500 may further include displaying, by the computing device 101, a result of the executions via the web-based application on the user device 102 associated with the user, at step 510. The result may be displayed in the form of listing stating the test scripts and their respective statuses. In addition, the result may also include the number of times the test scripts were run. In some embodiments, the result may be displayed in the form of graphs, pie charts, and the like.

Figure 6:
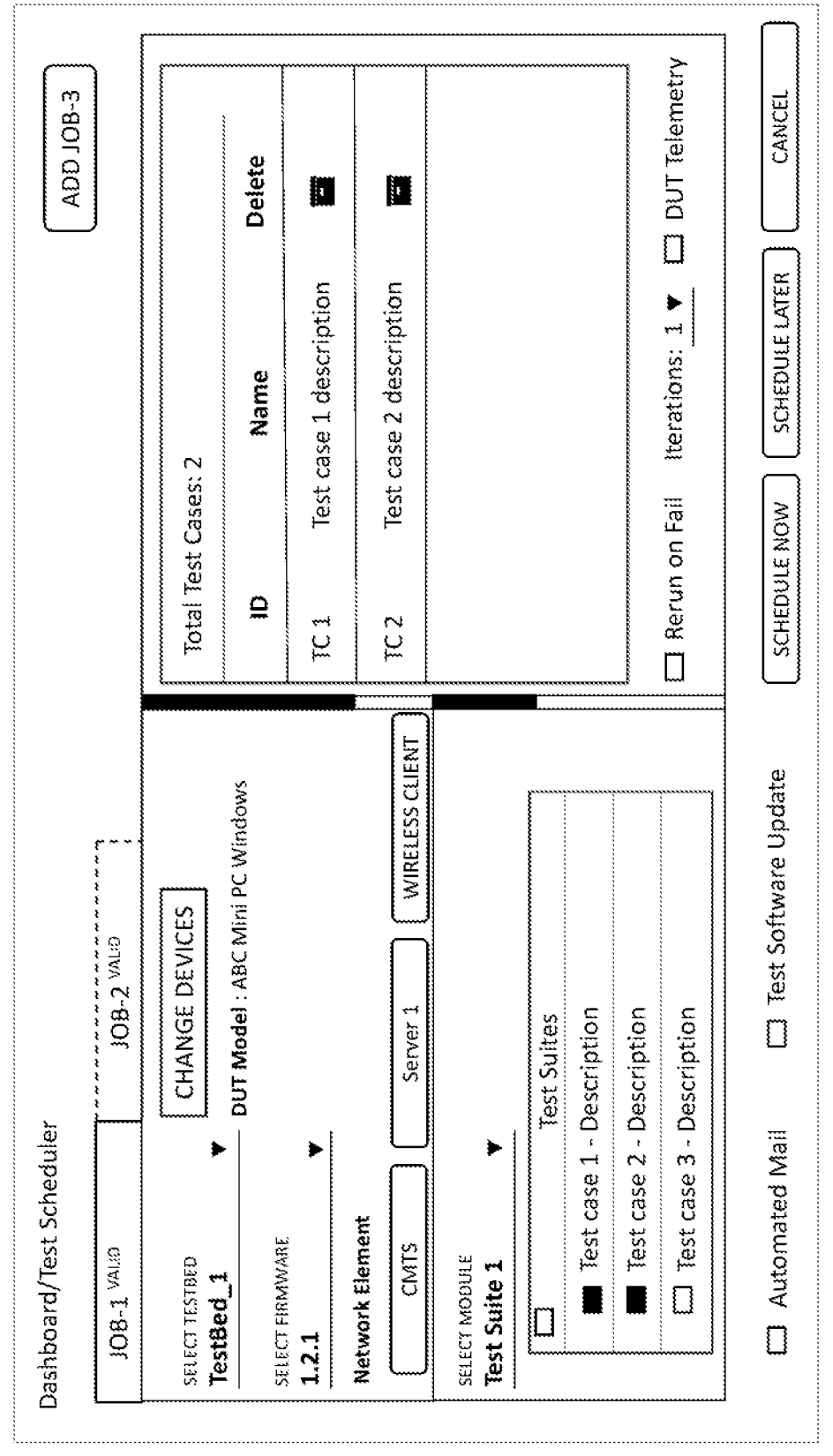
FIG. 6 is a screenshot of a user interface depicting a test schedular, in accordance with an exemplary embodiment of the present disclosure.
Figure 7:
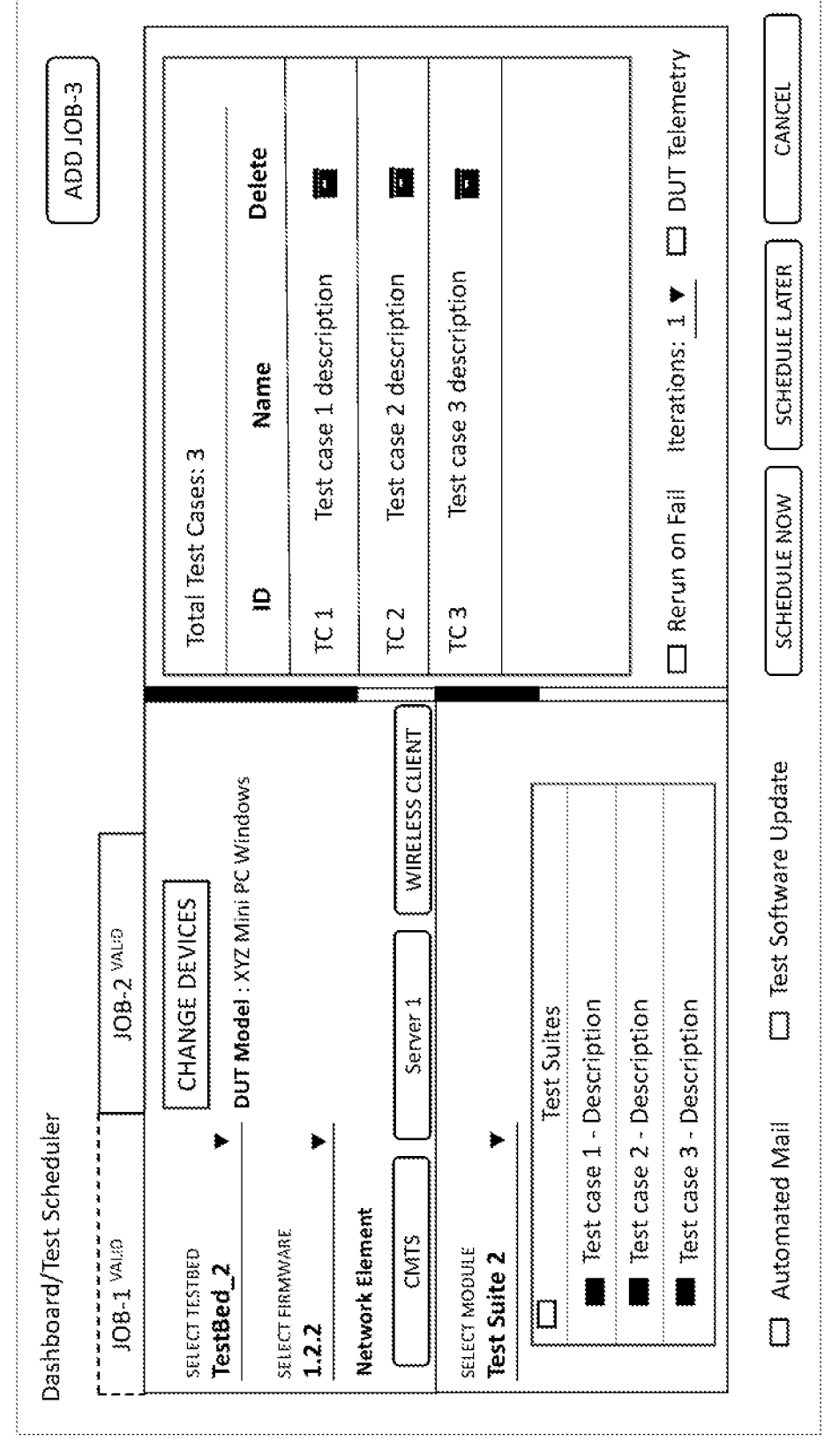
FIG. 7 is another screenshot of a user interface depicting a test schedular, in accordance with an exemplary embodiment of the present disclosure.

FIGS. 6 and 7 illustrate screenshots of a user interface depicting a test schedular, which is also referred to as dashboard. The user interface may be the GUI 211 displayed on the user device 102. For instance, as depicted in FIG. 6, a user may create JOB-1 for scheduling a test script. The user may provide input data as shown on the left side of the screenshot. The input data may be a name of the test bed, a firmware name, selection of network elements, selection of test cases in a test suite, and the like. The selected test cases appear on the right panel of the test scheduler. A user may delete the test case using the delete button. The user may also choose whether to rerun the test cases if they fail. The user may choose the number of iterations that the failed test cases to be executed. In some embodiments, the user may not choose whether to rerun the failed test cases, but the machine learning model decides whether to rerun the failed test cases.

The GUI 211 may provide a user with an option to schedule the execution of test script immediately or at a later point in time. Before scheduling the execution, a user may select options like send an automated report mail after the test execution. In such cases, at the end of the test execution, the smart orchestrator module 302 may send an automated report mail to the address specified by the user. In some embodiments, the user may select an option to update the test results into testing software packages like JIRA and ALM etc.

A user may be provided with an option to schedule execution of multiple test scripts at the same time parallelly in the test schedular via the GUI 211. For example, FIG. 6 depicts scheduling the test execution of two test cases in "Test Suite 1" under "JOB-1." FIG. 7 depicts scheduling the test execution of three test cases in "Test Suite 2" under "JOB-2." A user may add another job for executing a third test suite by selecting the icon "ADD JOB-3" on the upper right corner of the test scheduler.

Figure 8:
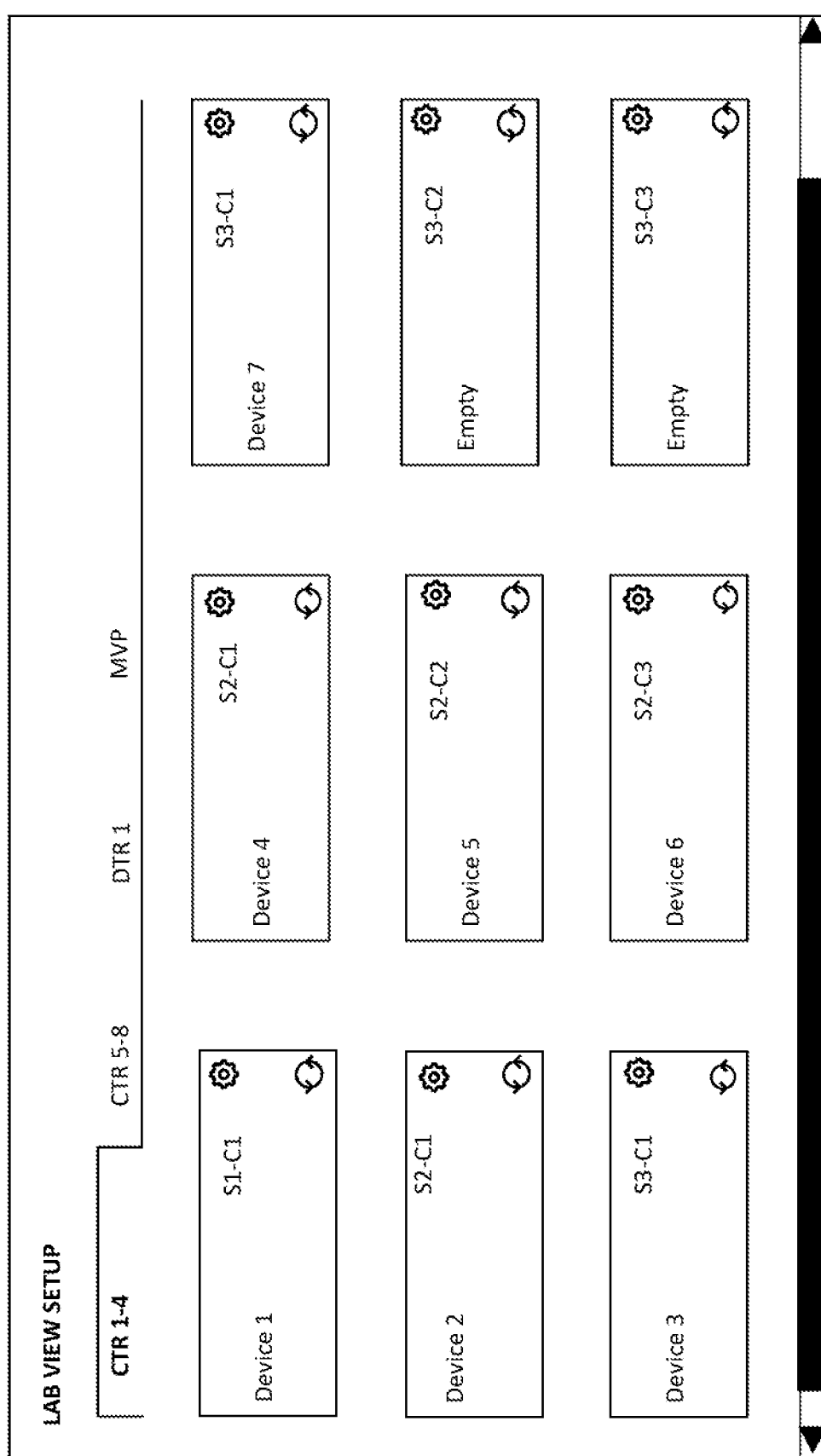
FIG. 8 is a screenshot of a user interface depicting a visual representation of devices in a network, in accordance with an exemplary embodiment of the present disclosure.

FIG. 8 illustrates a screenshot of the GUI 211 depicting a visual representation of devices in a network. The screenshot depicts a lab view setup mentioning the devices utilized in the test execution and their respective location in a lab in real time. In some embodiments, the status or health data of the devices may be visible on the GUI 211 in real time. The health data may be an IP connectivity status, CPU utilization, memory utilization, an antenna temperature, Wi-Fi chipset temperature, upload and download speeds, and/or voice call activity. In some embodiments, a user may select or hover over any one of the representations of the devices to view the health data of the selected device. In other embodiments, the health data for all the devices may be visible at the same time. The health data may be visible to the user while a test execution is in progress. The user may select the devices using touch-based input, or voice input, or haptic-based input etc.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
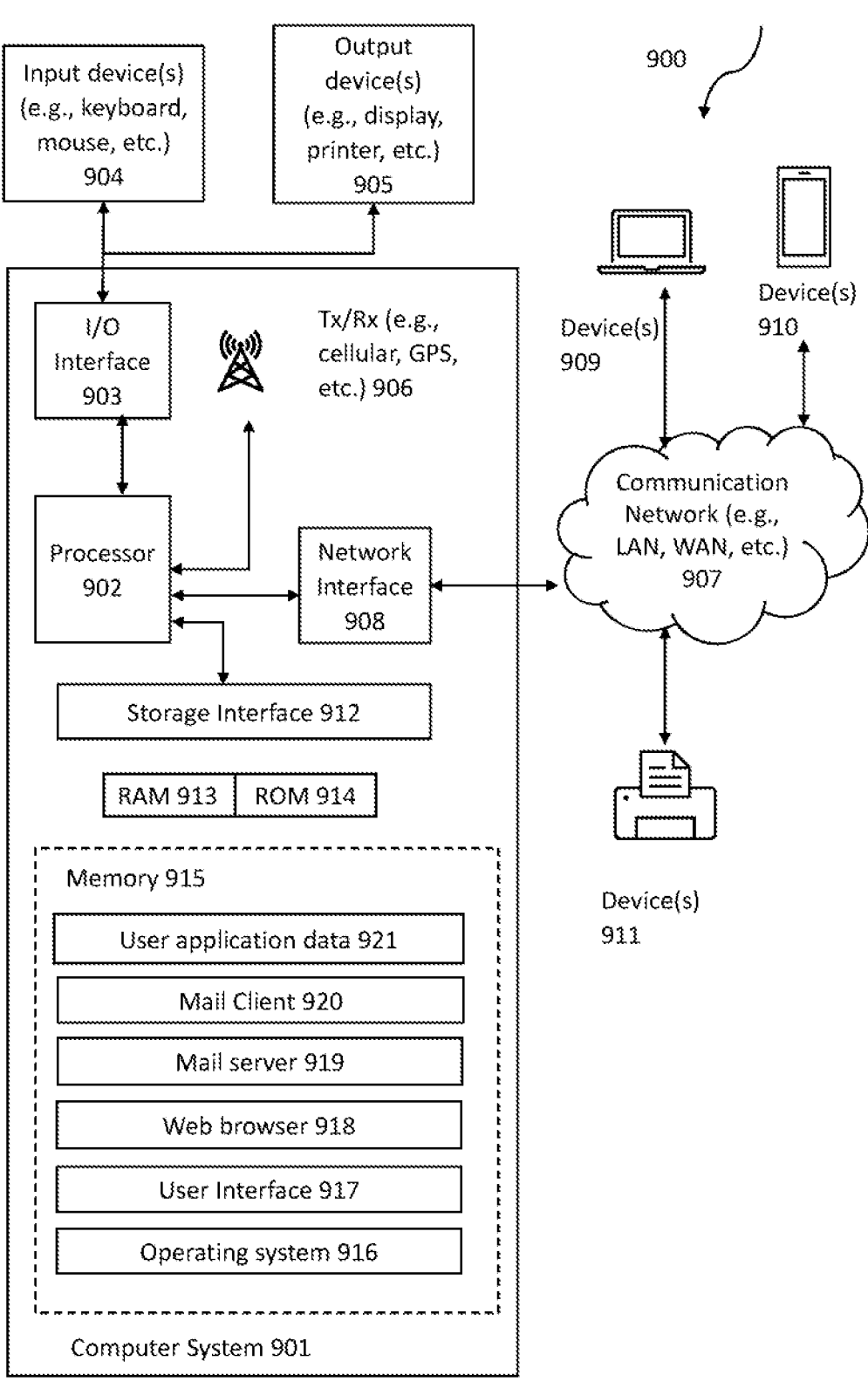
FIG. 9 is a block diagram of a system architecture of a computer system for framework agnostic smart test orchestration in network test automation, in accordance with an exemplary embodiment of the present disclosure.

The disclosed methods and systems may be implemented on a conventional or a general-purpose computer system, such as a personal computer (PC) or server computer. FIG. 9 is a block diagram that illustrates a system architecture 900 of a computer system 901 for framework agnostic smart test orchestration in network test automation for a network, in accordance with an exemplary embodiment of the present disclosure. Variations of computer system 901 may be used for implementing computing device 101 for framework agnostic smart test orchestration in network test automation for a network. Computer system 901 may include a central processing unit ("CPU" or "processor") 902. Processor 902 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 902 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver 906 may facilitate various types of wireless transmission or reception. For example, the transceiver 906 may include an antenna operatively connected to a transceiver chip (e.g., TEXAS INSTRUMENTS® WILINK WL1286®, BROADCOM® BCM4550IUB8®, INFINEON TECHNOLOGIESR X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 907 via a network interface 908. The network interface 908 may communicate with the communication network 907. The network interface 908 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 907 may include, without limitation, a direct interconnection, local area network (LAN), wide area network (WAN), wireless network (e.g., using Wireless Application Protocol), the Internet, etc. Using the network interface 908 and the communication network 907, the computer system 901 may communicate with devices 905, 909, 910, and 911. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 901 may itself embody one or more of these devices.

In some embodiments, the processor 902 may be disposed in communication with one or more memory devices 915 (e.g., RAM 913, ROM 914, etc.) via a storage interface 912. The storage interface 912 may connect to memory devices 915 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 915 may store a collection of program or database components, including, without limitation, an operating system 916, user interface 917, web browser 918, mail server 919, mail client 920, user/application data 921 (e.g., any data variables or data records discussed in this disclosure), etc. The operating system 916 may facilitate resource management and operation of the computer system 901. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8/10/11, etc.), APPLE® IOS®, GOOGLE® ANDROID®, BLACKBERRY® OS, or the like. User interface 917 may facilitate display, execution, interaction, manipulation, or operation of program components through textual or graphical facilities. For example, user interfaces may provide computer interaction interface elements on a display system operatively connected to the computer system 901, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 901 may implement a web browser 918 stored program component. The web browser 918 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 901 may implement a mail server 919 stored program component. The mail server 919 may be an Internet mail server such as MICROSOFT® EXCHANGE®, or the like. The mail server 919 may utilize facilities such as ASP, ActiveX, ANSI C++/C#, MICROSOFT.NET® CGI scripts, JAVA®, JAVASCRIPT®, PERL®, PHP®, PYTHON®, WebObjects, etc. The mail server 1119 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 901 may implement a mail client 920 stored program component. The mail client 920 may be a mail viewing application, such as APPLE MAIL®, MICROSOFT ENTOURAGE®, MICROSOFT OUTLOOK®, MOZILLA THUNDERBIRD®, etc.

In some embodiments, computer system 901 may store user/application data 921, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of using different testing tools for different frameworks supported by the devices. Classical or traditional approaches for network testing devices supporting different frameworks struggle with manual labor costs, resources consumed, and the human efforts required to be trained in all the technologies. The disclosed method and system receive from a user device via a web-based application, input data for executing one or more test scripts to test one or more functions on one or more devices in the network and parse the input data. Further, the method and system select an execution module, from a plurality of execution modules, for executing the one or more test scripts on the one or more devices based on the parsed input data. Further, the method and system execute the one or more test scripts to test the one or more functions on the one or more devices using the selected execution module.

As will be appreciated by those skilled in the art, the techniques described in the various embodiments discussed above are not routine, or conventional, or well understood in the art. The techniques discussed above provide for framework agnostic smart test orchestration in network test automation for a network. The techniques perform scheduling and execution of test suites irrespective of the framework supported by the test suites in a network. This is possible using the third-party plugins (connected to third-party test tools) which support multiple frameworks for network test execution. Thus, the overall cycle time of network test orchestration is significantly reduced. The techniques integrate multiple third-party test tools into single framework and generates a uniform report for all the test case irrespective of the framework supported by them.

Further, a user may schedule execution of test suites from a remote location, via a web browser on a user device. Therefore, there is no requirement for a user to physically be present at the location of the devices. Further, the user may schedule the execution of test cases immediately or later. The proposed techniques support dynamic topology creation/selection with the lab device monitoring. A user may be provided a live telemetry report of the health of devices involved in the test execution, irrespective of the communication protocols supported by the devices. The machine learning models of the smart orchestration module increases the quantity of passed test cases by automatically scheduling re-execution of failed test cases. Further, multiple test scripts can be executed simultaneously by the smart orchestration module.

The solutions described in the disclosure is a cloud native solution and is designed to scale across labs, domains (Cable, Fiber, Voice, IMS, video, IOT, SDN, 5G, Web Apps, mobile Apps), technology (Java, TCL/Tk, Python, cloud containers, MEAN stack) and can automate various network devices at different lifecycle phases (Precertification, Devops, certification, and production) of product/service and can be integrated with multiple test drivers. This solution enables tester to develop automation scripts easily, plan and schedule test cases, generate live reports and dashboard with various analysis to fit an organization needs. This solution also allows seamless integration of third-party test tools, test management software to facilitate a tester to have a single window browser-based solution.

Considering the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for framework agnostic smart test orchestration in network test automation for a network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A method for framework agnostic smart test orchestration in network test automation for a network, the method comprising:
    receiving, by a computing device from a user device via a web-based application, input data for executing one or more test scripts to test one or more functions on one or more devices in the network;
    parsing, by the computing device, the input data;
    selecting, by the computing device, an execution module from a plurality of execution modules, for executing the one or more test scripts on the one or more devices based on the parsed input data; and
    executing, by the computing device, the one or more test scripts to test the one or more functions on the one or more devices using the selected execution module.

2. The method of claim 1, wherein the input data comprises a network topology and at least a test suite comprising the one or more test scripts, wherein the one or more devices are connected to form the network topology.

3. The method of claim 2, further comprising:
    parsing, by the computing device, the at least one test suite for identifying a test framework associated with the one or more test scripts; and
    selecting, by the computing device, the execution module based on the identified test framework.

4. The method of claim 1, further comprising:
    continuously monitoring, by the computing device, health data of the one or more devices while executing the one or more scripts; and
    displaying, by the computing device on the user device via the web-based application, the health data of the one or more devices while executing the one or more test scripts.

5. The method of claim 4, wherein the health data of each of the one or more devices comprises one or more of: an IP connectivity status, CPU utilization, memory utilization, an antenna temperature, Wi-Fi chipset temperature, upload and download speeds, and voice call activity.

6. The method of claim 1, wherein the plurality of execution modules is configured to execute one or more test frameworks comprising pytest, python behave, Mocha, TestNG, Robo framework, or REST.

7. The method of claim 1, further comprising:
    parsing, by the computing device, a test result, wherein the test result is a result of the execution of the one or more test scripts on the one or more devices;
    detecting, by the computing device, a failure in execution of at least one test script of the one or more test scripts;

automatically determining, by the computing device, whether to rerun execution of the at least one failed test script based on historical data and parsed test result using a machine learning model;

in case it is determined by the machine learning model to execute the at least one failed test script, executing, by the computing device, the at least one failed test script using the selected execution module for a predetermined number of iterations; and displaying, by the computing device, a result of the executions via the web-based application on the user device associated with the user.

8. The method of claim 1, wherein the one or more devices comprise one or more of: a Wi-Fi gateway, IP phones, set top boxes, Wi-Fi clients, Wi-Fi boosters, LAN/WAN clients, routers, switches, or cable modems.

9. A system for framework agnostic smart test orchestration in network test automation for a network, the system comprising:

a processing circuitry; and a memory communicatively coupled to the processing circuitry, wherein the memory stores processor instructions, which when executed by the processing circuitry, cause the processing circuitry to:

receive, from a user device via a web-based application, input data for executing one or more test scripts to test one or more functions on one or more devices in the network;

parse the input data;

select an execution module from a plurality of execution modules, for executing the one or more test scripts on the one or more devices based on the parsed input data; and execute the one or more test scripts to test the one or more functions on the one or more devices using the selected execution module.

10. The system of claim 9, wherein the input data comprises a network topology and at least a test suite comprising the one or more test scripts, wherein the one or more devices are connected to form the network topology.

11. The system of claim 10, wherein the processing circuitry is further caused to:

parse the at least one test suite for identifying a test framework associated with the one or more test scripts; and select the execution module based on the identified test framework.

12. The system of claim 9, wherein the one or more devices comprise one or more of: a Wi-Fi gateway, IP phones, set top boxes, Wi-Fi clients, Wi-Fi boosters, LAN/WAN clients, routers, switches, or cable modems.

13. The system of claim 9, wherein the processing circuitry is further caused to:

continuously monitor health data of the one or more devices while executing the one or more test scripts, wherein the health data of each of the one or more devices comprises one or more of: an IP connectivity status, CPU utilization, memory utilization, an antenna temperature, Wi-Fi chipset temperature, upload and download speeds, or voice call activity; and display, on the user device via the web-based application, the health data of the one or more devices while executing the one or more test scripts.

14. The system of claim 9, wherein the plurality of execution modules is configured to execute one or more test frameworks comprising pytest, python behave, Mocha, TestNG, Robo framework, or REST.

15. The system of claim 9, wherein the processing circuitry is further caused to:

parse a test result, wherein the test result is a result of the execution of the one or more test scripts on the one or more devices;

detect a failure in execution of at least one test script of the one or more test scripts;

automatically determine whether to rerun execution of the at least one failed test script based on historical data and parsed test result using a machine learning model;

in case it is determined by the machine learning model to execute the at least one failed test script, execute the at least one failed test script using the selected execution module for a predetermined number of iterations; and display a result of the executions via the web-based application on the user device associated with the user.

16. A method for framework agnostic smart test orchestration in network test automation for a network, the method comprising:

receiving, by a computing device from a user device via a web-based application, input data;

parsing, by the computing device, the input data;

selecting, by the computing device, an execution module and one or more telemetry modules based on the parsed input data, wherein each of the one or more telemetry modules corresponds to each of one or more devices in the network;

executing, by the computing device, at least one test script to test one or more functions on the one or more devices using the selected execution module;

monitoring, by the computing device, health data of the one or more devices using the selected one or more telemetry modules; and displaying by the computing device on the user device:

the health data of the one or more devices while executing the at least one test script, and a result of the execution of the at least one test script after completion of the execution of the at least one test script.

17. The method of claim 16, wherein execution module is configured to execute one or more test frameworks comprising pytest, python behave, Mocha, TestNG, Robo framework, and REST, and wherein the one or more telemetry modules are configured to read protocols comprising one or more of: SNMPv2, SNMPv3, TR-181, TR-69, WebPA, or REST.

18. The method of claim 16, wherein the input data comprises a network topology and at least a test suite comprising the one or more test scripts, wherein the one or more devices are connected to form the network topology.

19. The method of claim 16, wherein the health data of each of the one or more devices comprises one or more of: an IP connectivity status, CPU utilization, memory utilization, an antenna temperature, Wi-Fi chipset temperature, upload and download speeds, or voice call activity.

20. The method of claim 16, further comprising:

parsing, by the computing device, a test result, wherein the test result is a result of the execution of the one or more test scripts on the one or more devices;

detecting, by the computing device, a failure in execution of at least one test script of the one or more test scripts;

automatically determining, by the computing device, whether to rerun execution of the at least one failed test script based on historical data and parsed test result using a machine learning model;

in case it is determined by the machine learning model to execute the at least one failed test script, executing, by the computing device, the at least one failed test script
using the selected execution module for a predeter-
mined number of iterations; and displaying, by the computing device, a result of the
executions via the web-based application on the user
device associated with the user.

* * * * *

22